(12) United States Patent
Sah et al.

(10) Patent No.: US 9,097,337 B2
(45) Date of Patent: Aug. 4, 2015

(54) METHOD AND APPARATUS TO CONTROL HYDRAULIC LINE PRESSURE IN AN ELECTRO-MECHANICAL TRANSMISSION

(75) Inventors: Jy-Jen F. Sah, West Bloomfield, MI (US); Ali K Naqvi, White Lake, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 1571 days.

(21) Appl. No.: 12/249,379

(22) Filed: Oct. 10, 2008

(65) Prior Publication Data

US 2009/0112421 A1  Apr. 30, 2009

Related U.S. Application Data

(60) Provisional application No. 60/982,840, filed on Oct. 26, 2007.

(51) Int. Cl.
| | | |
|---|---|---|
| F16H 61/00 | (2006.01) | |
| F16H 3/72 | (2006.01) | |
| F16H 59/72 | (2006.01) | |
| F16H 37/10 | (2006.01) | |

(52) U.S. Cl.
CPC ........ *F16H 61/0031* (2013.01); *F16H 61/0021* (2013.01); *F16H 61/0025* (2013.01); *F16H 3/728* (2013.01); *F16H 59/72* (2013.01); *F16H 2037/102* (2013.01); *F16H 2037/104* (2013.01); *F16H 2037/106* (2013.01)

(58) Field of Classification Search
USPC .................. 701/1, 51, 60; 477/117, 156–158; 903/914
See application file for complete search history.

(56) References Cited

U.S. PATENT DOCUMENTS

| | | | | |
|---|---|---|---|---|
| 4,033,201 | A * | 7/1977 | Sakai .............................. | 477/61 |
| 4,749,239 | A * | 6/1988 | Onogi et al. .................. | 303/167 |
| 6,022,293 | A * | 2/2000 | Dourra et al. ................. | 477/158 |
| 6,089,364 | A * | 7/2000 | Kunii .......................... | 192/85.63 |
| 6,135,919 | A * | 10/2000 | Shimakura .................... | 477/157 |
| 6,344,016 | B1 * | 2/2002 | Eguchi .......................... | 477/175 |
| 6,530,860 | B2 * | 3/2003 | Ui ..................................... | 477/45 |
| 6,692,402 | B2 * | 2/2004 | Nakamori et al. ................ | 477/3 |
| 6,719,080 | B1 * | 4/2004 | Gray, Jr. ........................ | 180/165 |
| 6,730,000 | B1 * | 5/2004 | Leising et al. ................ | 477/110 |
| 6,805,647 | B2 * | 10/2004 | Silveri et al. ...................... | 477/3 |

(Continued)

FOREIGN PATENT DOCUMENTS

| | | |
|---|---|---|
| EP | 2 055 997 A2 | 5/2009 |
| GB | 2 399 398 A | 9/2004 |

(Continued)

*Primary Examiner* — Helal A Algahaim
*Assistant Examiner* — Donald J Wallace

(57) ABSTRACT

A method for controlling hydraulic line pressure of a hydraulic control system in transmission includes determining an available flow from a plurality of hydraulic pumps, determining a flow consumption of functions served by the hydraulic control system, determining an estimated hydraulic line pressure based upon the flow from the pumps and the flow consumption, determining a desired hydraulic line pressure, and controlling the hydraulic pumps based upon the desired hydraulic line pressure and the estimated hydraulic line pressure.

10 Claims, 5 Drawing Sheets

(56) References Cited

U.S. PATENT DOCUMENTS

| | | | |
|---|---|---|---|
| 6,832,148 B1 | 12/2004 | Bennett | |
| 6,868,318 B1 | 3/2005 | Cawthorne | |
| 6,959,545 B2* | 11/2005 | Lippert et al. | 60/430 |
| 7,154,236 B1 | 12/2006 | Heap | |
| 7,306,538 B2* | 12/2007 | Kodama et al. | 477/44 |
| 7,543,695 B2* | 6/2009 | Redelman et al. | 192/221 |
| 7,972,241 B2* | 7/2011 | Schiele et al. | 477/98 |
| 2004/0029677 A1 | 2/2004 | Mori et al. | |
| 2004/0179962 A1* | 9/2004 | Hopper | 417/426 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao et al. | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |
| 2005/0255963 A1 | 11/2005 | Hsieh | |
| 2005/0255964 A1 | 11/2005 | Heap | |
| 2005/0255965 A1 | 11/2005 | Tao | |
| 2005/0255966 A1 | 11/2005 | Tao | |
| 2005/0255967 A1 | 11/2005 | Foster | |
| 2005/0255968 A1 | 11/2005 | Sah | |
| 2005/0256617 A1 | 11/2005 | Cawthorne | |
| 2005/0256618 A1 | 11/2005 | Hsieh | |
| 2005/0256623 A1 | 11/2005 | Hubbard | |
| 2005/0256625 A1 | 11/2005 | Sah | |
| 2005/0256626 A1 | 11/2005 | Hsieh | |
| 2005/0256627 A1 | 11/2005 | Sah | |
| 2005/0256629 A1 | 11/2005 | Tao | |
| 2005/0256631 A1 | 11/2005 | Cawthorne | |
| 2005/0256633 A1 | 11/2005 | Heap | |
| 2005/0256919 A1 | 11/2005 | Cawthorne | |
| 2006/0073924 A1* | 4/2006 | Izumi et al. | 474/28 |
| 2006/0194670 A1 | 8/2006 | Heap | |
| 2007/0078580 A1 | 4/2007 | Cawthorne | |
| 2007/0093953 A1 | 4/2007 | Heap | |
| 2007/0149348 A1 | 6/2007 | Holmes | |
| 2007/0191181 A1 | 8/2007 | Burns | |
| 2007/0225886 A1 | 9/2007 | Morris | |
| 2007/0225887 A1 | 9/2007 | Morris | |
| 2007/0225888 A1 | 9/2007 | Morris | |
| 2007/0225889 A1 | 9/2007 | Morris | |
| 2007/0260381 A1 | 11/2007 | Sah | |
| 2007/0276569 A1 | 11/2007 | Sah | |
| 2007/0284162 A1 | 12/2007 | Zettel | |
| 2007/0284163 A1 | 12/2007 | Heap | |
| 2007/0284176 A1* | 12/2007 | Sah et al. | 180/305 |
| 2007/0285059 A1 | 12/2007 | Zettel | |
| 2007/0285060 A1 | 12/2007 | Zettel | |
| 2007/0285061 A1 | 12/2007 | Zettel | |
| 2007/0285063 A1 | 12/2007 | Zettel | |
| 2007/0285097 A1 | 12/2007 | Zettel | |
| 2008/0004779 A1 | 1/2008 | Sah | |
| 2008/0028879 A1 | 2/2008 | Robinette | |
| 2008/0032855 A1 | 2/2008 | Sah | |
| 2008/0064559 A1 | 3/2008 | Cawthorne | |
| 2008/0064562 A1 | 3/2008 | Zettel | |
| 2008/0103003 A1* | 5/2008 | Sah et al. | 475/5 |
| 2008/0119320 A1 | 5/2008 | Wu | |
| 2008/0119321 A1 | 5/2008 | Heap | |
| 2008/0120000 A1 | 5/2008 | Heap | |
| 2008/0120001 A1 | 5/2008 | Heap | |
| 2008/0120002 A1 | 5/2008 | Heap | |
| 2008/0176706 A1 | 7/2008 | Wu | |
| 2008/0176709 A1 | 7/2008 | Wu | |
| 2008/0181280 A1 | 7/2008 | Wang | |
| 2008/0182696 A1* | 7/2008 | Sah et al. | 475/117 |
| 2008/0183372 A1 | 7/2008 | Snyder | |
| 2008/0188351 A1* | 8/2008 | Schiele et al. | 477/98 |
| 2008/0234097 A1 | 9/2008 | Sah | |
| 2008/0236921 A1 | 10/2008 | Huseman | |
| 2008/0243346 A1 | 10/2008 | Huseman | |
| 2008/0249745 A1 | 10/2008 | Heap | |
| 2008/0262694 A1 | 10/2008 | Heap | |
| 2008/0262698 A1 | 10/2008 | Lahti | |
| 2008/0272717 A1 | 11/2008 | Gleason | |
| 2008/0275611 A1 | 11/2008 | Snyder | |
| 2008/0275624 A1 | 11/2008 | Snyder | |
| 2008/0275625 A1 | 11/2008 | Snyder | |
| 2008/0287255 A1 | 11/2008 | Snyder | |
| 2009/0069148 A1 | 3/2009 | Heap | |
| 2009/0069989 A1 | 3/2009 | Heap | |
| 2009/0070019 A1 | 3/2009 | Heap | |
| 2009/0082170 A1 | 3/2009 | Heap | |
| 2009/0088294 A1 | 4/2009 | West | |
| 2009/0105039 A1 | 4/2009 | Sah | |
| 2009/0105896 A1 | 4/2009 | Tamai | |
| 2009/0105898 A1 | 4/2009 | Wu | |
| 2009/0105914 A1 | 4/2009 | Buur | |
| 2009/0107745 A1 | 4/2009 | Buur | |
| 2009/0107755 A1 | 4/2009 | Kothari | |
| 2009/0108673 A1 | 4/2009 | Wang | |
| 2009/0111637 A1 | 4/2009 | Day | |
| 2009/0111640 A1 | 4/2009 | Buur | |
| 2009/0111642 A1 | 4/2009 | Sah | |
| 2009/0111643 A1 | 4/2009 | Sah | |
| 2009/0111644 A1 | 4/2009 | Kaminsky | |
| 2009/0111645 A1 | 4/2009 | Heap | |
| 2009/0112385 A1 | 4/2009 | Heap | |
| 2009/0112392 A1 | 4/2009 | Buur | |
| 2009/0112399 A1 | 4/2009 | Buur | |
| 2009/0112412 A1 | 4/2009 | Cawthorne | |
| 2009/0112416 A1 | 4/2009 | Heap | |
| 2009/0112417 A1 | 4/2009 | Kaminsky | |
| 2009/0112418 A1 | 4/2009 | Buur | |
| 2009/0112419 A1 | 4/2009 | Heap | |
| 2009/0112420 A1 | 4/2009 | Buur | |
| 2009/0112422 A1 | 4/2009 | Sah | |
| 2009/0112423 A1 | 4/2009 | Foster | |
| 2009/0112427 A1 | 4/2009 | Heap | |
| 2009/0112428 A1 | 4/2009 | Sah | |
| 2009/0112429 A1 | 4/2009 | Sah | |
| 2009/0112495 A1 | 4/2009 | Center | |
| 2009/0115349 A1 | 5/2009 | Heap | |
| 2009/0115350 A1 | 5/2009 | Heap | |
| 2009/0115351 A1 | 5/2009 | Heap | |
| 2009/0115352 A1 | 5/2009 | Heap | |
| 2009/0115353 A1 | 5/2009 | Heap | |
| 2009/0115354 A1 | 5/2009 | Heap | |
| 2009/0115365 A1 | 5/2009 | Heap | |
| 2009/0115373 A1 | 5/2009 | Kokotovich | |
| 2009/0115377 A1 | 5/2009 | Schwenke | |
| 2009/0115408 A1 | 5/2009 | West | |
| 2009/0115491 A1 | 5/2009 | Anwar | |
| 2009/0118074 A1 | 5/2009 | Zettel | |
| 2009/0118075 A1 | 5/2009 | Heap | |
| 2009/0118076 A1 | 5/2009 | Heap | |
| 2009/0118077 A1 | 5/2009 | Hsieh | |
| 2009/0118078 A1 | 5/2009 | Wilmanowicz | |
| 2009/0118079 A1 | 5/2009 | Heap | |
| 2009/0118080 A1 | 5/2009 | Heap | |
| 2009/0118081 A1 | 5/2009 | Heap | |
| 2009/0118082 A1 | 5/2009 | Heap | |
| 2009/0118083 A1 | 5/2009 | Kaminsky | |
| 2009/0118084 A1 | 5/2009 | Heap | |
| 2009/0118085 A1 | 5/2009 | Heap | |
| 2009/0118086 A1 | 5/2009 | Heap | |
| 2009/0118087 A1 | 5/2009 | Hsieh | |
| 2009/0118089 A1 | 5/2009 | Heap | |
| 2009/0118090 A1 | 5/2009 | Heap | |
| 2009/0118091 A1 | 5/2009 | Lahti | |
| 2009/0118093 A1 | 5/2009 | Heap | |

(56) References Cited

U.S. PATENT DOCUMENTS

| | | |
|---|---|---|
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap et al. |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |
| 2011/0106351 A1* | 5/2011 | Sah et al. ................ 701/22 |

FOREIGN PATENT DOCUMENTS

| | | | | |
|---|---|---|---|---|
| JP | 7019304 A | * | 1/1995 | ............ F16H 61/00 |
| WO | 2006 099947 A1 | | 9/2006 | |
| WO | 2006 136320 A1 | | 12/2006 | |
| WO | WO-2006136320 A1 | * | 12/2006 | ............ F16H 57/04 |

* cited by examiner

METHOD AND APPARATUS TO CONTROL HYDRAULIC LINE PRESSURE IN AN ELECTRO-MECHANICAL TRANSMISSION

CROSS REFERENCE TO RELATED APPLICATIONS

This application claims the benefit of U.S. Provisional Application No. 60/982,840 filed on Oct. 26, 2007 which is hereby incorporated herein by reference.

TECHNICAL FIELD

This disclosure pertains to control systems for electromechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electromechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed. A hydraulic control system is known to provide pressurized hydraulic oil for a number of functions throughout the powertrain.

Operation of the above devices within a hybrid powertrain vehicle require management of numerous torque bearing shafts or devices representing connections to the above mentioned engine, electrical machines, and driveline. Input torque from the engine and input torque from the electric machine or electric machines can be applied individually or cooperatively to provide output torque. Various control schemes and operational connections between the various aforementioned components of the hybrid drive system are known, and the control system must be able to engage to and disengage the various components from the transmission in order to perform the functions of the hybrid powertrain system. Engagement and disengagement are known to be accomplished within the transmission by employing selectively operable clutches.

Clutches are devices well known in the art for engaging and disengaging shafts including the management of rotational velocity and torque differences between the shafts. Clutches are known in a variety of designs and control methods. One known type of clutch is a mechanical clutch operating by separating or joining two connective surfaces, for instance, clutch plates, operating, when joined, to apply frictional torque to each other. One control method for operating such a mechanical clutch includes applying the hydraulic control system implementing fluidic pressures transmitted through hydraulic lines to exert or release clamping force between the two connective surfaces. Operated thusly, the clutch is not operated in a binary manner, but rather is capable of a range of engagement states, from fully disengaged, to synchronized but not engaged, to engaged but with only minimal clamping force, to engaged with some maximum clamping force. The clamping force available to be applied to the clutch determines how much reactive torque the clutch can carry before the clutch slips.

The hydraulic control system, as described above, utilizes lines charged with hydraulic oil to selectively activate clutches within the transmission. However, the hydraulic control system is also known to perform a number of other functions in a hybrid powertrain. For example, an electric machine utilized within a hybrid powertrain generates heat. Known embodiments utilize hydraulic oil from the hydraulic control system in a continuous flow to cool the electric machine in a base machine cooling function. Other known embodiments additionally are known to react to higher electric machine temperatures with a selectable or temperature driven active machine cooling function, providing additional cooling in the high temperature condition. Additionally, known embodiments utilize hydraulic oil to lubricate mechanical devices, such as bearings. Also, hydraulic circuits are known to include some level of internal leakage.

Hydraulic oil is known to be pressurized within a hydraulic control system with a pump. The pump can be electrically powered or preferably mechanically driven. In addition to this first main hydraulic pump, hydraulic control systems are known to also include an auxiliary hydraulic pump. The internal impelling mechanism rotates operates at some speed, drawing hydraulic oil from a return line and pressurizing the hydraulic control system. The supply of hydraulic flow by the pump or pumps is affected by the speed of the pumps, the back pressure exerted by the hydraulic line pressure ($P_{LINE}$), and the temperature of the hydraulic oil ($T_{OIL}$).

The resulting or net $P_{LINE}$ within the hydraulic control system is impacted by a number of factors. FIG. 1 schematically illustrates a model of factors impacting hydraulic flow in an exemplary hydraulic control system, in accordance with the present disclosure. As one having ordinary skill in the art will appreciate, conservation of mass explains that, in steady state, flow entering a system must equal the flow exiting from that system. As applied to FIG. 1, a flow of hydraulic oil is supplied to the hydraulic control system by the pumps. The flow exits the hydraulic control system through the various functions served by the hydraulic control system. This exemplary embodiment includes the following functions: hydraulic oil fills clutch mechanisms in order to provide clamping force required to lock the clutch, as described above; hydraulic oil provides both base cooling and active cooling of the electric machines and other components as required; hydraulic oil is used to lubricate portions of the transmission; and hydraulic oil flows through leakage internal to the hydraulic circuit. $P_{LINE}$ describes the resulting charge of hydraulic oil maintained in the system: for any flow through a system, the resulting pressure within the system depends upon the flow resistance within the system. Higher flow resistance in the system results in higher system pressures for a given flow. Conversely, lower flow resistance in the system results in lower system pressures for a given flow. Applied to FIG. 1, $P_{LINE}$ or the pressure within the hydraulic control system, changes depending upon usage of the hydraulic control system. For example, filling a previously unfilled transmission clutch consumes a significant amount of hydraulic oil from the hydraulic control system. The orifice leading to the clutch includes low resistance in order to draw the significant amount of hydraulic oil over a short time span. As a result, during the clutch filling process, $P_{LINE}$ in an otherwise unchanged hydraulic control system will reduce. Conversely, for a given set of functions served by the hydraulic control system, $P_{LINE}$ varies based upon the flow supplied by the pumps. For any given set of flow restrictions associated with the functions served, increased flow from the pumps will result in higher $P_{LINE}$.

As noted above, main hydraulic pumps are known to be powered mechanically, driven as a parasitic device from the engine. Hybrid powertrains are known to operate with an engine running or stopped, depending upon the current hybrid control strategy. Under engine stopped operation in a powertrain utilizing a mechanically driven main pump, the main pump cannot provide a supply of hydraulic flow, and, instead, an auxiliary pump must be used to provide $P_{LINE}$ required to operate the vehicle. A method to accurately control $P_{LINE}$ in a hybrid powertrain through engine running and stopped operation would provide useful control of the hydraulic control system.

SUMMARY

A method for controlling hydraulic line pressure of a hydraulic control system in an electromechanical transmission adapted to selectively transmit mechanical power to an output member includes determining an available flow from a main hydraulic pump, determining an available flow from an auxiliary hydraulic pump, determining a flow consumption of functions served by the hydraulic control system, determining an estimated hydraulic line pressure based upon the flow from the main hydraulic pump, the flow from the auxiliary hydraulic pump, and the flow consumption, determining a desired hydraulic line pressure to fulfill functions served by the hydraulic control system, comparing the desired hydraulic line pressure to the estimated hydraulic line pressure, and controlling the main hydraulic pump and the auxiliary hydraulic pump based upon the comparing the desired hydraulic line pressure to the estimated hydraulic line pressure.

BRIEF DESCRIPTION OF THE DRAWINGS

One or more embodiments will now be described, by way of example, with reference to the accompanying drawings, in which.

DETAILED DESCRIPTION

Figures 1, 3:
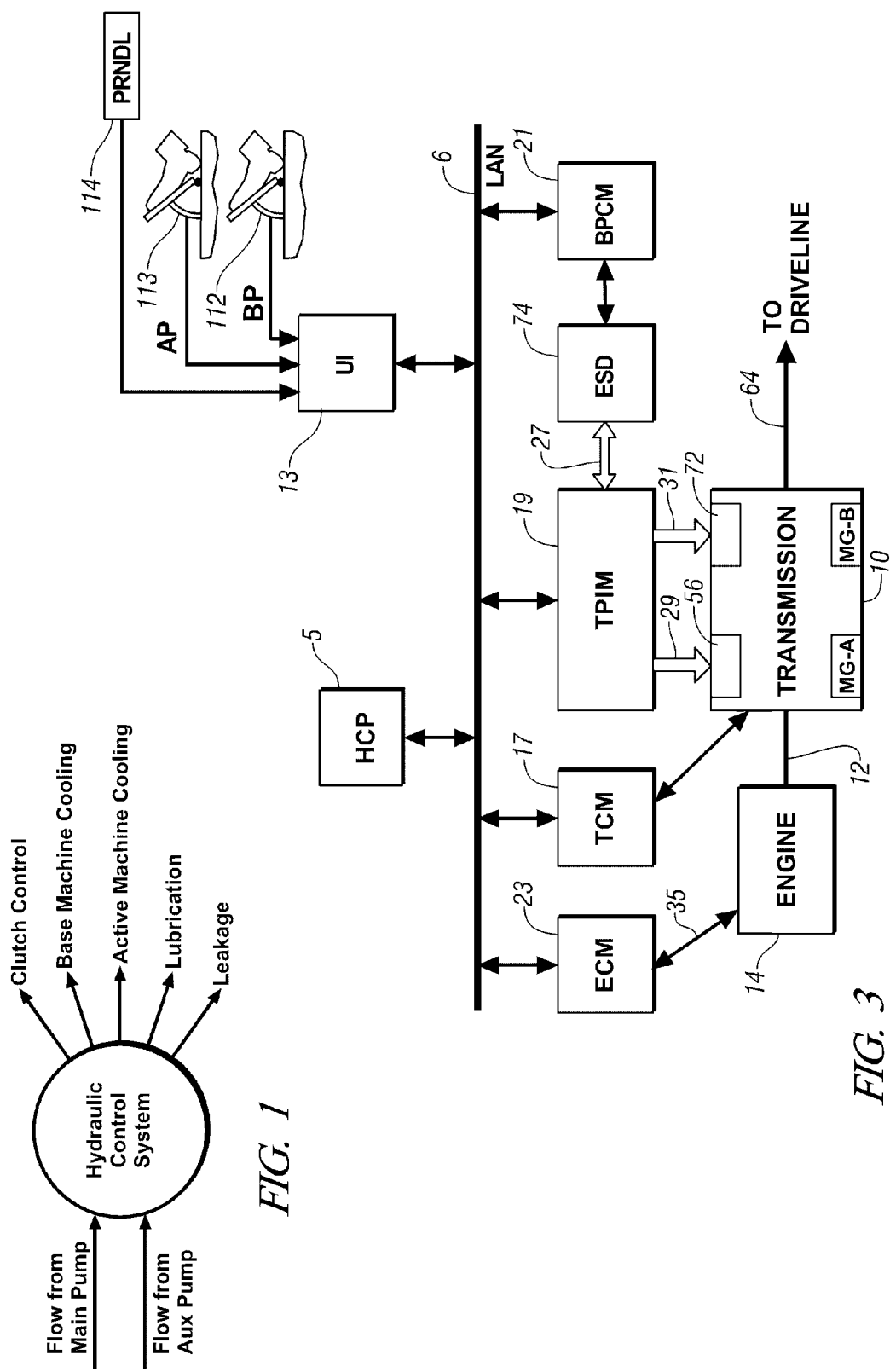
FIG. 1 schematically illustrates a model of factors impacting hydraulic flow in an exemplary hydraulic control system, in accordance with the present disclosure.
FIG. 3 is a schematic diagram of an exemplary architecture for a control system and powertrain, in accordance with the present disclosure.
Figure 2:
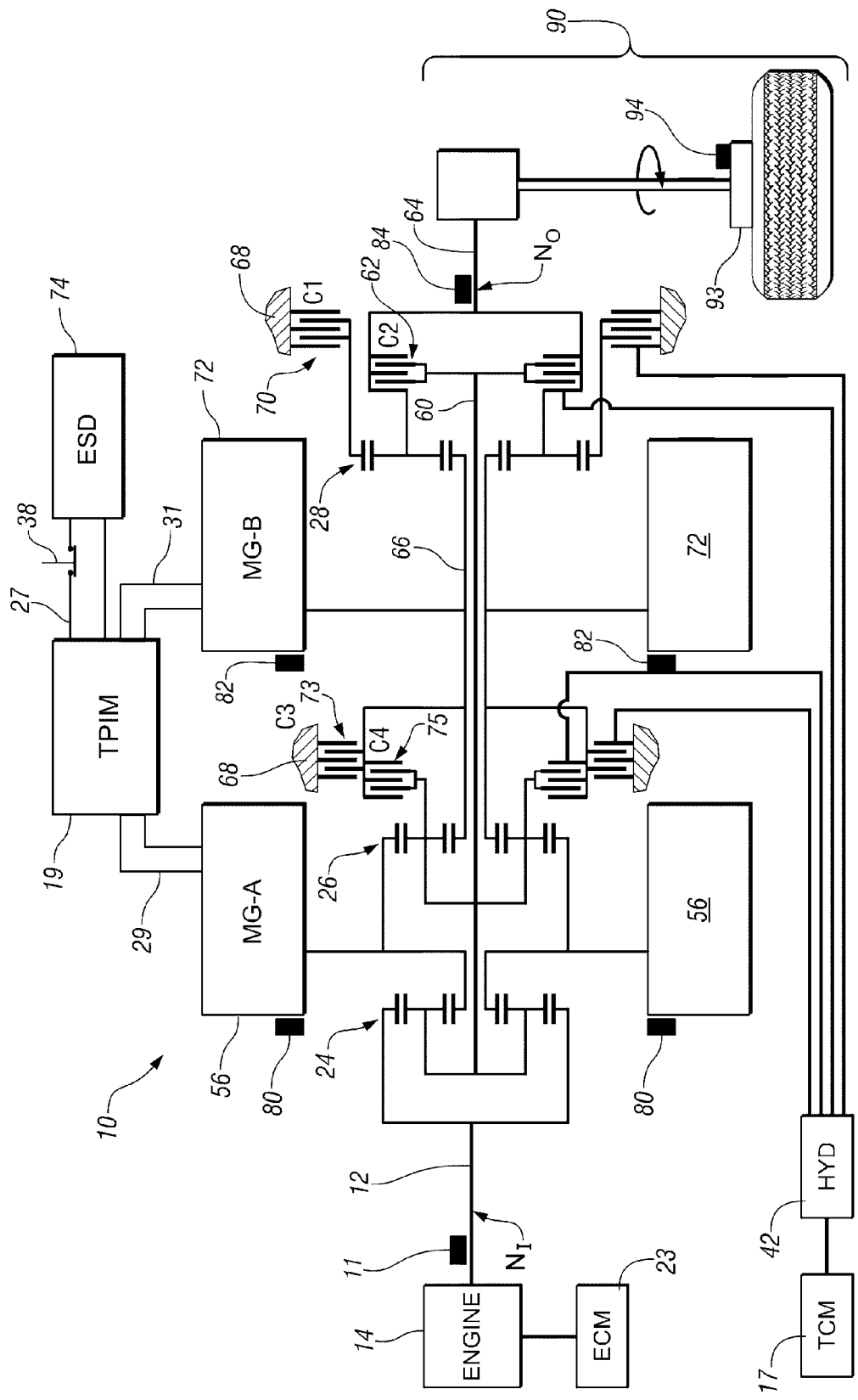
FIG. 2 is a schematic diagram of an exemplary powertrain, in accordance with the present disclosure.

Referring now to the drawings, wherein the showings are for the purpose of illustrating certain exemplary embodiments only and not for the purpose of limiting the same, FIGS. 2 and 3 depict an exemplary electro-mechanical hybrid powertrain. The exemplary electromechanical hybrid powertrain in accordance with the present disclosure is depicted in FIG. 2, comprising a two-mode, compound-split, electromechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic oil via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 2. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS-WHL}$, the output of which is monitored by a control module of a distributed control module system described with respect to FIG. 3, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 3 is a schematic block diagram of the distributed control module system. The elements described hereinafter comprise a subset of an overall vehicle control architecture, and provide coordinated system control of the exemplary powertrain described in FIG. 2. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

The exemplary powertrain selectively operates in one of several operating range states that can be described in terms of an engine state comprising one of an engine on state ('ON') and an engine off state ('OFF'), and a transmission state comprising a plurality of fixed gears and continuously variable operating modes, described with reference to Table 1, below.

TABLE 1

| Description | Engine State | Transmission Operating Range State | Applied Clutches | |
| --- | --- | --- | --- | --- |
| MI_Eng_Off | OFF | EVT Mode I | C1 70 | |
| MI_Eng_On | ON | EVT Mode I | C1 70 | |
| FG1 | ON | Fixed Gear Ratio 1 | C1 70 | C4 75 |
| FG2 | ON | Fixed Gear Ratio 2 | C1 70 | C2 62 |
| MII_Eng_Off | OFF | EVT Mode II | C2 62 | |
| MII_Eng_On | ON | EVT Mode II | C2 62 | |
| FG3 | ON | Fixed Gear Ratio 3 | C2 62 | C4 75 |
| FG4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode I, or MI, is selected by applying clutch C1 70 only in order to "ground" the outer gear member of the third planetary gear set 28. The engine state can be one of ON ('MI_Eng_On') or OFF ('MI_Eng_Off'). A second continuously variable mode, i.e., EVT Mode II, or MII, is selected by applying clutch C2 62 only to connect the shaft 60 to the carrier of the third planetary gear set 28. The engine state can be one of ON ('MII_Eng_On') or OFF ('MII_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$, is achieved. A first fixed gear operation ('FG1') is selected by applying clutches C1 70 and C4 75. A second fixed gear operation ('FG2') is selected by applying clutches C1 70 and C2 62. A third fixed gear operation ('FG3') is selected by applying clutches C2 62 and C4 75. A fourth fixed gear operation ('FG4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_{O\_REQ}$, to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electromechanical transmission 10 are mechanically-operatively coupled to transmit power therebetween to generate a power flow to the output member 64.

Figure 4:
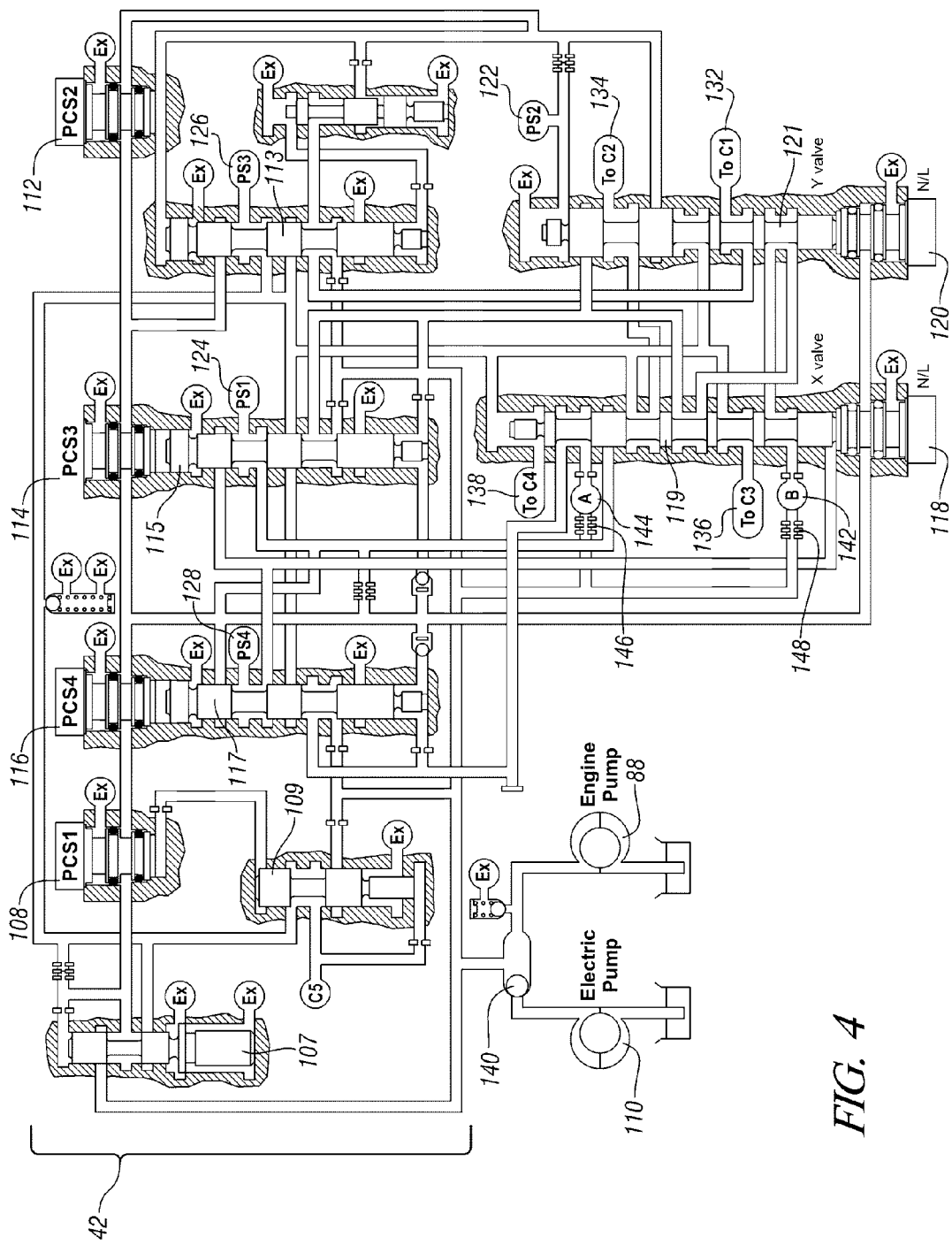
FIG. 4 is a schematic diagram of a hydraulic circuit, in accordance with the present disclosure.

FIG. 4 depicts a schematic diagram of the hydraulic control circuit 42 for controlling flow of hydraulic oil in the exemplary transmission. A main hydraulic pump 88 is driven off the input shaft 12 from the engine 14, and an auxiliary pump 110 controlled by the TPIM 19 to provide pressurized fluid to the hydraulic control circuit 42 through valve 140. The auxiliary pump 110 preferably comprises an electrically-powered pump of an appropriate size and capacity to provide sufficient flow of pressurized hydraulic oil into the hydraulic control circuit 42 when operational. The hydraulic control circuit 42 selectively distributes hydraulic pressure to a plurality of devices, including the torque-transfer clutches C1 70, C2 62, C3 73, and C4 75, active cooling circuits for the first and second electric machines 56 and 72 (not shown), and a base cooling circuit for cooling and lubricating the transmission 10 via passages 142, 144 (not depicted in detail). As previously stated, the TCM 17 actuates the various clutches to achieve one of the transmission operating range states through selective actuation of hydraulic circuit flow control devices comprising variable pressure control solenoids ('PCS') PCS1 108, PCS2 114, PCS3 112, PCS4 116 and solenoid-controlled flow management valves, X-valve 119 and Y-valve 121. The hydraulic control circuit 42 is fluidly connected to pressure switches PS1, PS2, PS3, and PS4 via passages 122, 124, 126, and 128, respectively. The pressure control solenoid PCS1 108 has a control position of normally high and is operative to modulate the magnitude of fluidic pressure in the hydraulic circuit through fluidic interaction with controllable pressure regulator 107 and spool valve 109. The controllable pressure regulator 107 and spool valve 109 interact with PCS1 108 to control hydraulic pressure in the hydraulic control circuit 42 over a range of pressures and may provide additional functionality for the hydraulic control circuit 42. Pressure control solenoid PCS3 112 has a control position of normally high, and is fluidly connected to spool valve 113 and operative to effect flow therethrough when actuated. Spool valve 113 is fluidly connected to pressure switch PS3 via passage 126. Pressure control solenoid PCS2 114 has a control position of normally high, and is fluidly connected to spool valve 115 and operative to effect flow therethrough when actuated. Spool valve 115 is fluidly connected to pressure switch PS2 via passage 124. Pressure control solenoid PCS4 116 has a control position of normally low, and is fluidly connected to spool valve 117 and operative to effect flow therethrough when actuated. Spool valve 117 is fluidly connected to pressure switch PS4 via passage 128.

The X-Valve 119 and Y-Valve 121 each comprise flow management valves controlled by solenoids 118, 120, respectively, in the exemplary system, and have control states of High ('1') and Low ('0'). The control states refer to positions of each valve to which control flow to different devices in the hydraulic control circuit 42 and the transmission 10. The X-valve 119 is operative to direct pressurized fluid to clutches C3 73 and C4 75 and cooling systems for stators of the first and second electric machines 56 and 72 via fluidic passages 136, 138, 144, 142 respectively, depending upon the source of the fluidic input, as is described hereinafter. The Y-valve 121 is operative to direct pressurized fluid to clutches C1 70 and C2 62 via fluidic passages 132 and 134 respectively, depending upon the source of the fluidic input, as is described hereinafter. The Y-valve 121 is fluidly connected to pressure switch PSI via passage 122.

The hydraulic control circuit 42 includes a base cooling circuit for providing hydraulic oil to cool the stators of the first and second electric machines 56 and 72. The base cooling circuit includes fluid conduits from the valve 140 flowing directly to a flow restrictor which leads to fluidic passage 144 leading to the base cooling circuit for the stator of the first electric machine 56, and to a flow restrictor which leads to fluidic passage 142 leading to the base cooling circuit for the stator of the second electric machine 72. Active cooling of stators for the first and second electric machines 56 and 72 is effected by selective actuation of pressure control solenoids PCS2 114, PCS3 112 and PCS4 116 and solenoid-controlled flow management valves X-valve 119 and Y-valve 121, which leads to flow of hydraulic oil around the selected stator and permits heat to be transferred therebetween, primarily through conduction.

An exemplary logic table to accomplish control of the exemplary hydraulic control circuit 42 to control operation of the transmission 10 in one of the transmission operating range states is provided with reference to Table 2, below.

TABLE 2

| Transmission Operating Range State | X-Valve Logic No Latch | Y-Valve Logic C2 Latch | PCS1 Normal High | PCS2 Normal High | PCS3 Normal High | PCS4 Normal Low |
|---|---|---|---|---|---|---|
| EVT Mode I | 0 | 0 | Line Modulation | MG-B Stator Cool | C1 | MG-A Stator Cool |
| EVT Mode II | 0 | 1 | Line Modulation | C2 | MG-B Stator Cool | MG-A Stator Cool |
| Low Range | 1 | 0 | Line Modulation | C2 | C1 | C4 |
| High Range | 1 | 1 | Line Modulation | C2 | C3 | C4 |

A Low Range is defined as a transmission operating range state comprising one of the first continuously variable mode and the first and second fixed gear operations. A High Range is defined as a transmission operating range state comprising one of the second continuously variable mode and the third and fourth fixed gear operations. Selective control of the X-valve 119 and the Y-valve 121 and actuation of the solenoids PCS2 112, PCS3 114, PCS4 116 facilitate flow of hydraulic oil to actuate clutches C1 70, C2 63, C3 73, and C4 75, and provide cooling for the stators the first and second electric machines 56 and 72.

In operation, a transmission operating range state, i.e. one of the fixed gear and continuously variable mode operations, is selected for the exemplary transmission 10 based upon a variety of operating characteristics of the powertrain. This includes the operator torque request, typically communicated through inputs to the UI 13 as previously described. Additionally, a demand for output torque is predicated on external conditions, including, e.g., road grade, road surface conditions, or wind load. The operating range state may be predicated on a powertrain torque demand caused by a control module command to operate of the electrical machines in an electrical energy generating mode or in a torque generating mode. The operating range state can be determined by an optimization algorithm or routine operable to determine an optimum system efficiency based upon the operator torque request, battery state of charge, and energy efficiencies of the engine 14 and the first and second electric machines 56 and 72. The control system manages the input torques from the engine 14 and the first and second electric machines 56 and 72 based upon an outcome of the executed optimization routine, and system optimization occurs to improve fuel economy and manage battery charging. Furthermore, the operation can be determined based upon a fault in a component or system.

As mentioned above, the purpose of the hydraulic control system is to provide pressurized hydraulic oil for a number of functions throughout a hybrid powertrain. One having ordinary skill in the art will appreciate that control of the hydraulic control system in order to enable smooth and consistent operation of the functions served by providing a supply of hydraulic flow requires an understanding of $P_{LINE}$. $P_{LINE}$ is important to understanding the capacity of the hydraulic control system necessary to fill required functions. $P_{LINE}$ is also important to managing the operation of the pump or pumps utilized to provide the supply of hydraulic flow to the hydraulic control system.

$P_{LINE}$ describes the capacity that the hydraulic control system possesses to fulfill a required function. For instance, in a clutch control function, $P_{LINE}$ describes the maximum clamping force immediately available to the clutch. As described above, the capacity of the clutch to transmit reactive torque depends upon the clamping force applied to the clutch. Additionally, it will be appreciated that $P_{LINE}$ describes how quickly the clutch can be filled. In another example, one having ordinary skill in the art will appreciate that, with regards to electric machine cooling, either serving a base machine cooling function through the electric machine or selectively serving an active machine cooling function, the quantity of hydraulic oil passing through the heat exchange mechanism of the electric machine and the resulting heat exchange capacity of the function rise as a function of $P_{LINE}$. In another example, hydraulic oil can be used to lubricate a device, for instance, a bearing. The resulting flow to the device through a fixed orifice and the resulting ability of the hydraulic flow to meet the lubrication function is a function of $P_{LINE}$.

Understanding flow consumption by these functions served by the hydraulic control system is important for a number of reasons. As described in these examples and combined with an understanding of the required functions, a minimum $P_{LINE}$ or $P_{MIN}$ can be described for each function describing the line pressure necessary to fulfill the required function for a given set of circumstances. Circumstances affecting $P_{MIN}$ for each function can include $T_{OIL}$, describing the characteristics of the hydraulic oil supplied for the function, and function specific variables describing the function requirements, for instance, a heat rejection rate from the electric machine. In addition, understanding flow consumption by functions served by the hydraulic control system is also important to understanding the $P_{LINE}$ resulting from the aforementioned balance, illustrated in FIG. 1, between the in-flows from the hydraulic pumps and the flow consumption by the functions served.

$P_{LINE}$ is important to managing the operation of the pump or pumps utilized to provide the supply of hydraulic flow to the hydraulic control system, describing both an input to the operation of the pumps by describing the back pressure exerted on the pumps and also providing feedback to the operation of the pump or pumps providing a comparison to drive $P_{LINE}$ to a desire line pressure value. As described above, the output of each hydraulic pump supplying hydraulic flow to the hydraulic control system is affected by the back pressure exerted upon the pump. Additionally, accurate control of hydraulic pumps in order to provide a desired line pressure requires some measure of the current line pressure or $P_{LINE}$.

Based upon known conditions and known operation of the pump or pumps, different estimations can be made regarding the capability of the pumps to generate line pressure. For instance, a maximum current line pressure or $P_{MAX}$ can be defined, describing the maximum $P_{LINE}$ that can be generated if the current operational pumps were controlled to their highest flow settings. $P_{MAX}$ can include activating pumps, such an auxiliary pump, not currently active and can also include modulating or restricting functions consuming supply of hydraulic flow from the hydraulic control system. $P_{MAX}$ is useful to supply hydraulic flow to priority functions requiring high $P_{LINE}$ values, for instance, as required to quickly fill a transmission clutch.

Figure 5:
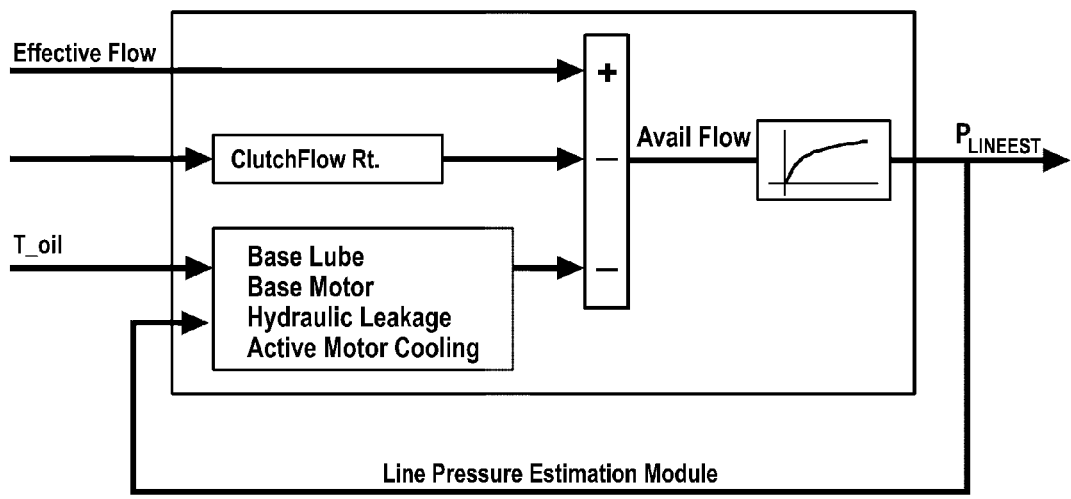
FIG. 5 schematically depicts an exemplary line pressure estimation module capable of estimating $P_{LINE}$, in accordance with the present disclosure.

$P_{LINE}$, as described above, is an important term useful to describe both requirements to be fulfilled by the hydraulic control system, and also in controlling pump operation. However, $P_{LINE}$ is frequently not directly measured. FIG. 5 schematically depicts an exemplary line pressure estimation module capable of estimating $P_{LINE}$, in accordance with the present disclosure. As described above, a number of factors are known to influence $P_{LINE}$, including the effective flow entering the hydraulic lines from the pumps, and the various devices consuming hydraulic pressure from the hydraulic lines of the hydraulic control system. The module generates an estimate of $P_{LINE}$ or $P_{LINEEST}$. Additionally, $P_{LINEEST}$ is fed-back to the module to include back pressure caused by $P_{LINE}$ in the determination of $P_{LINEEST}$. In this way, factors affecting $P_{LINE}$ can be modeled to generate $P_{LINEEST}$ for use in control of the hydraulic control system.

Figure 6:
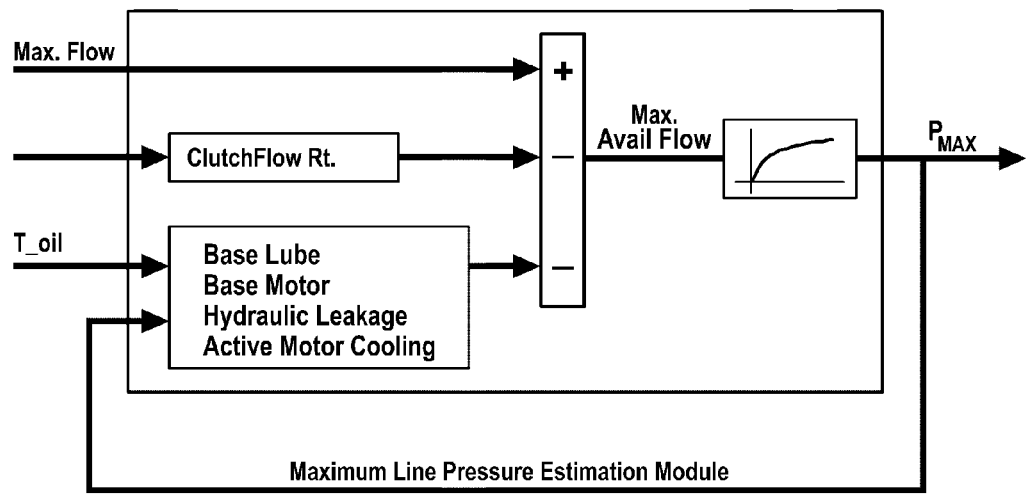
FIG. 6 schematically depicts an exemplary available line pressure estimation module capable of describing the maximum available pressure that can be generated by the hydraulic control system given current vehicle operation, in accordance with the present disclosure.

FIG. 6 schematically depicts an exemplary available line pressure estimation module capable of describing the maximum available pressure that can be generated by the hydraulic control system given current vehicle operation, in accordance with the present disclosure. In similar operation to the line pressure estimation module described above, the maximum available line pressure estimation module inputs describing various factors describing resulting $P_{LINE}$ and models an estimated maximum available pressure or $P_{MAX}$. In this way, factors affecting $P_{LINE}$ can be modeled to generate $P_{MAX}$ for use in control of the hydraulic control system.

As described above, main hydraulic pumps are known to be powered mechanically from the engine. Hybrid powertrains, taking full advantage of fuel efficient operating strategies, are known to operate with an engine running or stopped. Under engine stopped operation in a powertrain utilizing a mechanically driven main pump, the main pump cannot provide a supply of hydraulic flow, and, instead, an auxiliary pump must be used to provide $P_{LINE}$ required for operation of the various functions served by the hydraulic control system. A method to accurately control $P_{LINE}$ in a hybrid powertrain in conjunction with engine running and stopped operation is provided. By monitoring $P_{LINEEST}$, operation of a main hydraulic pump and an auxiliary hydraulic pump, in order to fill requirements of the functions served by the hydraulic control system and accounting for operational characteristics such as $T_{OIL}$ and $P_{LINE}$ back pressure, can be controlled through periods of engine running and engine stopped operation.

An understanding of $P_{LINE}$ in conjunction with an understanding of functions served by the hydraulic control system allows for determination of a desired line pressure or $P_{DESIRED}$. $P_{DESIRED}$ can include immediate requirements of the hydraulic control system based upon $P_{LINEEST}$, for instance, based upon a projection that a presently employed process to fill a clutch will cause $P_{LINE}$ to fall below $P_{MIN}$. Additionally, $P_{DESIRED}$ can include projections of expected requirements, for instance, a projected shift based upon accelerator pedal position or data available from such sources as historical driving patterns or a digital map device or increasing electric machine temperatures expected to soon require active cooling. Values, derivations, and modifying factors for determining $P_{DESIRED}$ may be developed experimentally, empirically, predictively, through modeling or other techniques adequate to accurately predict hydraulic control system operation, and a multitude of criteria for setting $P_{DESIRED}$ might be used by the same engine for each cylinder and for different engine settings, conditions, or operating ranges. Many factors are contemplated that can impact a selection of $P_{DESIRED}$, and the disclosure is not intended to be limited to the particular embodiments described herein. If no factors or motivations suggest that $P_{DESIRED}$ be set at an elevated level, $P_{DESIRED}$ can be set to $P_{MIN}$ in order to reduce power demands of the hydraulic pumps to the lowest possible level. In circumstances where an extreme need for high $P_{LINE}$ is expected, for instance, in response to a large change in accelerator pedal position indicating a need to immediately fill a clutch and supply maximum clamping force in the clutch, $P_{DESIRED}$ can be set to $P_{MAX}$ or simply be commanded to a maximum value.

Figure 7:
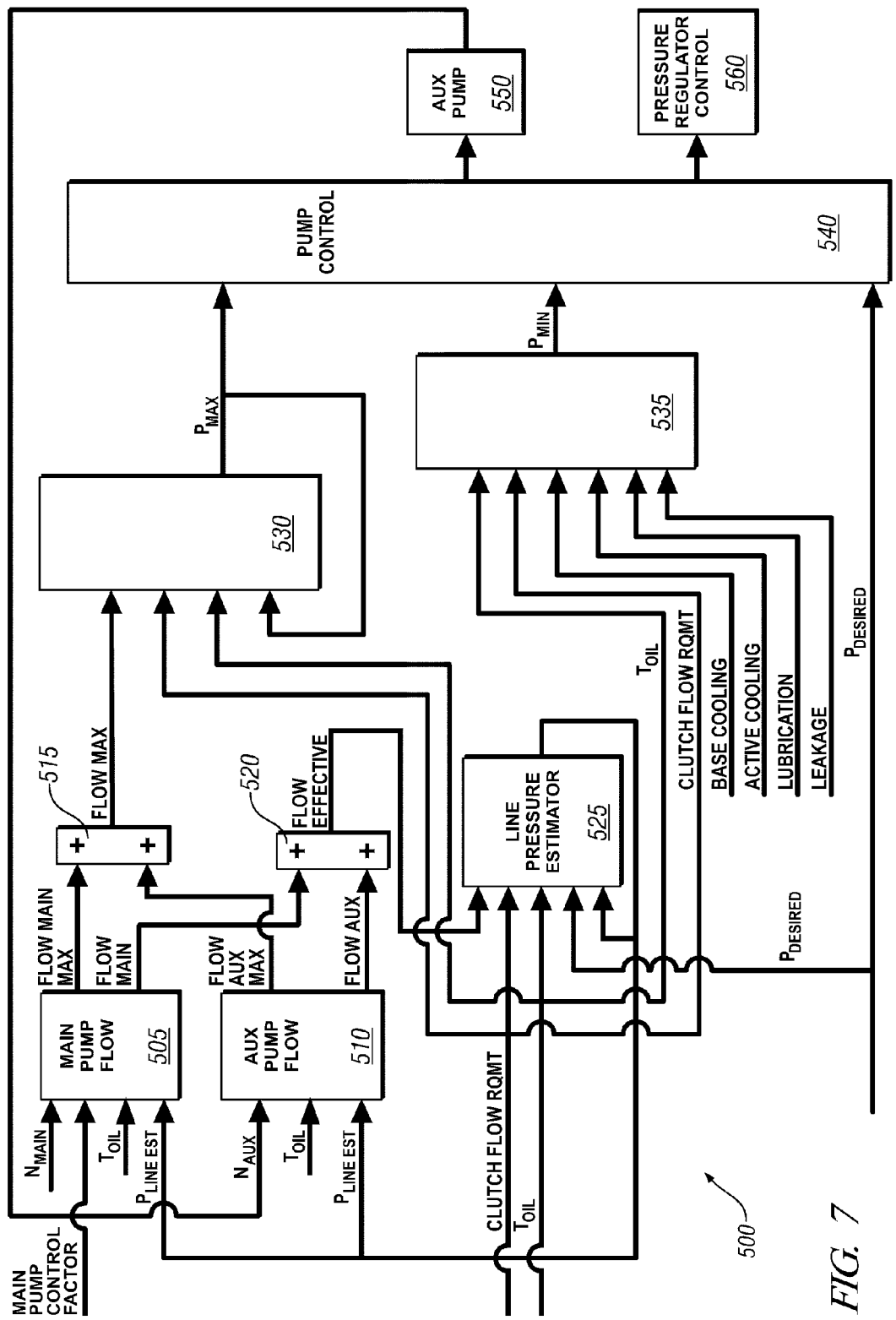
FIG. 7 schematically depicts an exemplary system utilizing a estimated hydraulic line pressure to control a main pump and an auxiliary pump within a range, in accordance with the present disclosure.

FIG. 7 schematically depicts an exemplary system utilizing $P_{LINEEST}$ to control a main pump and an auxiliary pump within a range set by $P_{MIN}$ and $P_{MAX}$, in accordance with the present disclosure. Pump control system 500 comprises a main pump flow module 505, an aux pump flow module 510, a flow max summation module 515, a flow effective summation module 520, a line pressure estimator module 525, a $P_{LINE}$ maximum determination module 530, a $P_{LINE}$ minimum determination module 535, a pump control module 540, and an auxiliary pump 550. Main pump flow module 505 receives as inputs $N_{MAIN}$, the indicated speed of the main pump; main pump control factors, indicating any measures taken to modulate hydraulic flow contributing to $P_{LINE}$ resulting from operation of the main pump; $T_{OIL}$; and a fed-back indication of $P_{LINEEST}$. It will be appreciated that $N_{MAIN}$ can be monitored directly from the main pump, or in the case of a mechanically driven pump with a direct drive ratio to the speed of the engine driving the pump, $N_{MAIN}$ can be derived by monitoring the engine speed and applying the drive ratio. Main pump control factors can include a description of any known means utilized by the system to modulate the output of the main pump, for example, the use of a selectable flow restrictor, a selectable flow bypass circuit, or operation of a solenoid used to affect resulting $P_{LINE}$. Main pump flow module 505 utilizes the inputs to model or estimate a FLOW MAIN term, describing hydraulic flow currently coming from the main pump and contributing to $P_{LINE}$. Additionally, main pump flow module 505 estimates FLOW MAIN MAX, describing the maximum flow that could be delivered from the main pump given current vehicle operation. Aux pump flow module 510 receives as inputs $N_{AUX}$, the indicated speed of the auxiliary pump 550; $T_{OIL}$; and a fed-back indication of $P_{LINEEST}$. Depending upon the hydraulic control system configuration, an additional input describing aux pump control factors could additionally be implemented. Aux pump flow module 510 utilizes the inputs to model or estimate a FLOW AUX term, describing hydraulic flow currently coming from the auxiliary pump and contributing to $P_{LINE}$. Additionally, aux pump flow module 510 estimates FLOW AUX MAX, describing the maximum flow that could be delivered from the auxiliary pump given current vehicle operation. Flow max summation module 515 receives the FLOW MAIN MAX and FLOW AUX MAX signals from the aforementioned flow modules and provides a flow max term describing the maximum flow that can be provided by the main and aux pumps given current vehicle operation. Similarly, flow effective summation module 520 receives the FLOW MAIN and FLOW AUX signals from the aforementioned flow modules and provides a flow effective term describing the total current flow that is being provided by the main and aux pumps. As described above in relation to FIG. 5, a line pressure estimator module 525 is operative to receive inputs and provide a $P_{LINEEST}$, describing the estimated current $P_{LINE}$. It should be noted that $P_{LINE}$ can be measured directly by a pressure transducer. $P_{LINE}$ maximum determination module 530 utilizes inputs, including resulting terms from modules 515 and 525, described above, to generate $P_{MAX}$. $P_{LINE}$ minimum determination module 535 utilizes inputs, including resulting terms describing the functional requirements that must be fulfilled by the hydraulic control system, to generate $P_{MIN}$. Pump control module 540 receives inputs from modules 525, 530, and 535, described above, and $P_{DESIRED}$. Pump control module includes a control output to auxiliary pump 550. Pump control module 540 can describe a single device issuing control commands to devices affecting the flow from the main pump, such as a flow regulator, and to auxiliary pump 550 and any device affecting the flow from auxiliary pump 550. Alternatively, pump control module 540 can inclusively describe a plurality of devices serving command and control functions associated with operation and modulation of the pumps and their outputs. Alternatively, pump control module 540 can communicate with other modules, for example, pressure regulator control module 560 as depicted.

While the above embodiments describe a system utilizing a main pump driven by the engine and an auxiliary pump electrically driven, one having ordinary skill in the art will appreciate that the methods described herein can be used with a wide variety of hydraulic control system configurations. For example, a single electrically powered pump can be used in place of the two pump embodiment described above, and $P_{LINE}$ can be used in to control such a configuration.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for controlling hydraulic line pressure of a hydraulic control system in an electro-mechanical transmission configured to selectively transmit mechanical power to an output member, said method comprising:
    determining an available flow from a main hydraulic pump;
    determining an available flow from an auxiliary hydraulic pump;
    determining a flow consumption of functions served by said hydraulic control system;
    determining an estimated hydraulic line pressure based upon said flow from said main hydraulic pump, said flow from said auxiliary hydraulic pump, and said flow consumption;
    said determining of the available flow from the main hydraulic pump and the available flow from the auxiliary hydraulic pump based on the determined estimated hydraulic line pressure;
    modeling behavior of said functions served by said hydraulic control system based upon immediate requirements and projections of expected requirements of the hydraulic control system;
    determining a minimum hydraulic line pressure to fulfill said functions served by said hydraulic control system;
    determining a desired hydraulic line pressure comprising one of said minimum hydraulic line pressure to fulfill said functions served by said hydraulic control system and a hydraulic line pressure determined based upon said modeling behavior of said functions served by said hydraulic control system;
    determining an estimated maximum available hydraulic line pressure based upon the estimated hydraulic line pressure;
    comparing said desired hydraulic line pressure to said estimated hydraulic line pressure; and
    modulating output of said main hydraulic pump and controlling said auxiliary hydraulic pump based upon said comparing said desired hydraulic line pressure to said estimated hydraulic line pressure and the estimated maximum available hydraulic line pressure;
    said modulating the output of the main hydraulic pump comprising controlling a selectable flow restrictor, and said controlling said auxiliary hydraulic pump comprising controlling rotational speed of the auxiliary hydraulic pump.

2. The method of claim 1, wherein determining said flow consumption of said functions served by said hydraulic control system includes monitoring selective application of a clutch within said transmission.

3. The method of claim 1, wherein determining said flow consumption of said functions served by said hydraulic control system includes monitoring supply of hydraulic oil to a constant flow restriction base motor cooling system.

4. The method of claim 1, wherein determining said flow consumption of said functions served by said hydraulic control system includes monitoring supply of hydraulic oil to a selectively active motor cooling system.

5. The method of claim 1, wherein determining said flow consumption of said functions served by said hydraulic control system includes monitoring supply of hydraulic oil to a lubrication circuit.

6. The method of claim 1, wherein determining available flow from said main hydraulic pump comprises:
    monitoring a pump speed of said main hydraulic pump; and
    determining said available flow from a main hydraulic pump based upon said hydraulic oil temperature and said pump speed of said main hydraulic pump;
    wherein said determining available flow from said auxiliary hydraulic pump comprises monitoring a pump speed of said auxiliary hydraulic pump, and
    determining available flow from said auxiliary hydraulic pump based upon said hydraulic oil temperature and said pump speed of said auxiliary hydraulic pump.

7. The method of claim 6,
    wherein said main hydraulic pump is mechanically driven by an engine, and
    wherein said monitoring said pump speed of said main hydraulic pump comprises monitoring a speed of said engine.

8. The method of claim 1, further comprising:
    determining a maximum achievable flow from said main hydraulic pump;
    determining a maximum achievable flow from said auxiliary hydraulic pump;
    determining flow consumption under maximum flow conditions of functions served by said hydraulic control system; and
    determining the estimated maximum available hydraulic line pressure based upon said maximum achievable flow from said main hydraulic pump, said maximum achievable flow from said auxiliary hydraulic pump, and said flow consumption under maximum flow conditions.

9. Method for controlling hydraulic line pressure of a hydraulic control system including main and auxiliary hydraulic pumps providing hydraulic oil to functions comprising transmission clutch control, electric machine cooling, and lubrication in an electro-mechanical transmission configured to selectively transmit mechanical power to an output member, said method comprising:
    monitoring factors affecting hydraulic pump operation including hydraulic oil temperature, hydraulic pump speeds, and hydraulic line back pressure;
    determining available flow from each hydraulic pump in said hydraulic control system;
    modeling flow consumption of said functions based upon immediate requirements and projections of expected requirements of the hydraulic control system;
    determining a minimum functional hydraulic line pressure to fulfill said functions served by said hydraulic control system;
    determining an estimated hydraulic line pressure based upon said flow from said hydraulic pumps and said flow consumption;
    said determining of the available flow from each hydraulic pump in said hydraulic control system based upon said determined estimated hydraulic line pressure;
    determining a desired hydraulic line pressure to fulfill functions served by said hydraulic control system, wherein said desired hydraulic line pressure is based upon the minimum functional hydraulic line pressure, a maximum achievable hydraulic line pressure, and said modeling said flow consumption of said functions, the desired hydraulic line pressure equal to one of:
        said minimum functional hydraulic line pressure unless said modeled flow consumption of said functions dictate an expected need for a hydraulic line pressure that is elevated from said minimum functional hydraulic line pressure, and
        an available hydraulic line pressure that is elevated from said minimum functional hydraulic line pressure when said modeled flow consumption of said functions dictate the expected need for the hydraulic line pressure that is elevated from said minimum functional hydraulic line pressure; and modulating output of said main hydraulic pump and controlling said auxiliary hydraulic pump to meet said desired hydraulic pressure based upon said estimated hydraulic line pressure and the maximum achievable hydraulic line pressure;

said modulating the output of the main hydraulic pump comprising controlling a selectable flow restrictor, and said controlling said auxiliary hydraulic pump comprising controlling rotational speed of the auxiliary hydraulic pump.

10. Apparatus for controlling hydraulic line pressure of a hydraulic control system in an electro-mechanical transmission configured to selectively transmit mechanical power to an output member, said apparatus comprising:

a main pump flow module configured to determine an available flow from a main hydraulic pump;

an auxiliary pump flow module configured to determine an available flow from an auxiliary hydraulic pump;

a line pressure estimation module configured to determine an estimated hydraulic line pressure based upon said flow from said main hydraulic pump, said flow from said auxiliary hydraulic pump, transmission clutch flow requirements, and a transmission oil temperature;

said determined available flow from the main hydraulic pump and said determined available flow from the auxiliary hydraulic pump based on said determined estimated hydraulic line pressure;

a hydraulic line pressure minimum determination module configured to determine minimum functional hydraulic line pressure operating as a first limit for said pump control module;

a hydraulic line pressure maximum determination module configured to determine a maximum achievable hydraulic line pressure operating as a second limit for said pump control module; and a pump control module configured to issue control commands to control a selectable flow restrictor modulating the output of said main hydraulic pump and to control rotational speed of said auxiliary hydraulic pump, said control commands based upon a desired hydraulic line pressure and said estimated hydraulic line pressure, said desired hydraulic line pressure including the minimum functional hydraulic line pressure and the maximum achievable hydraulic line pressure, said desired hydraulic line pressure equal to said minimum functional hydraulic line pressure unless said estimated hydraulic line pressure dictates an expected need for a hydraulic line pressure that is elevated from said minimum hydraulic line pressure.

* * * * *